US010539004B2

(12) United States Patent
Wu et al.

(10) Patent No.: US 10,539,004 B2
(45) Date of Patent: Jan. 21, 2020

(54) WELL RANGING APPARATUS, SYSTEMS, AND METHODS

(71) Applicant: Halliburton Energy Services, Inc., Houston, TX (US)

(72) Inventors: Hsu-Hsiang Wu, Sugar Land, TX (US); Akram Ahmadi Kalateh Ahmad, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 1126 days.

(21) Appl. No.: 14/769,548

(22) PCT Filed: Aug. 4, 2015

(86) PCT No.: PCT/US2015/043639
§ 371 (c)(1),
(2) Date: Aug. 21, 2015

(87) PCT Pub. No.: WO2016/025247
PCT Pub. Date: Feb. 18, 2016

(65) Prior Publication Data
US 2016/0273344 A1 Sep. 22, 2016

Related U.S. Application Data

(60) Provisional application No. 62/035,877, filed on Aug. 11, 2014, provisional application No. 62/037,440, (Continued)

(51) Int. Cl.
*E21B 47/022* (2012.01)
*G01V 3/26* (2006.01)
(Continued)

(52) U.S. Cl.
CPC .......... *E21B 47/02216* (2013.01); *E21B 7/04* (2013.01); *E21B 33/14* (2013.01);
(Continued)

(58) Field of Classification Search
CPC .. E21B 47/02216; E21B 47/022; E21B 44/00; E21B 7/04; E21B 47/024;
(Continued)

(56) References Cited

U.S. PATENT DOCUMENTS 4,372,398 A 2/1983 Kuckes
4,443,762 A 4/1984 Kuckes
(Continued)

FOREIGN PATENT DOCUMENTS

WO WO-2007/015087 A1 2/2007
WO WO-2012/134468 A1 10/2012
(Continued)

OTHER PUBLICATIONS

"International Application Serial No. PCT/US2015/043639, International Search Report dated Oct. 27, 2015", 3 pgs.
(Continued)

*Primary Examiner* — Regis J Betsch
*Assistant Examiner* — Kaleria Knox
(74) *Attorney, Agent, or Firm* — Gilliam IP PLLC

(57) ABSTRACT

Disclosed embodiments include well ranging apparatus, systems, and methods which operate to receive normal and tangential components of electromagnetic field strength measurements within a first well as a set of field strength components from at least one sensor, wherein the at least one sensor is used to take multiple azimuthal field strength measurements at a single depth. Further activities include determining an approximate range from the at least one sensor to a second well that serves as a source of an electromagnetic field, via direct transmission or backscatter transmission, when a ranging direction associated with a housing upon which the at least one sensor is mounted is unknown. Additional apparatus, systems, and methods are disclosed.

20 Claims, 7 Drawing Sheets

Related U.S. Application Data filed on Aug. 14, 2014, provisional application No. 62/078,732, filed on Nov. 12, 2014.

(51) Int. Cl.
| | |
|---|---|
| *E21B 7/04* | (2006.01) |
| *E21B 33/14* | (2006.01) |
| *E21B 47/024* | (2006.01) |
| *G01V 99/00* | (2009.01) |
| *G06F 17/11* | (2006.01) |
| *E21B 43/24* | (2006.01) |
| *E21B 47/12* | (2012.01) |
| *E21B 47/18* | (2012.01) |

(52) U.S. Cl.
CPC .............. *E21B 47/024* (2013.01); *G01V 3/26* (2013.01); *G01V 99/005* (2013.01); *G06F 17/11* (2013.01); *E21B 43/2406* (2013.01); *E21B 47/12* (2013.01); *E21B 47/122* (2013.01); *E21B 47/18* (2013.01)

(58) Field of Classification Search
CPC .......... E21B 47/122; G01V 3/26; G01V 3/30; G01V 1/40; G01V 99/005; G06F 17/11
USPC .................... 702/7; 175/45; 73/1.79; 367/25
See application file for complete search history.

(56) References Cited

U.S. PATENT DOCUMENTS

| | | | |
|---|---|---|---|
| 4,700,142 A | 10/1987 | Kuckes | |
| 4,763,520 A | 8/1988 | Titchener et al. | |
| 4,933,640 A | 6/1990 | Kuckes | |
| 5,065,100 A | 11/1991 | Vail, III | |
| 5,084,678 A | 1/1992 | Hutin | |
| 5,189,415 A | 2/1993 | Shimada et al. | |
| 5,230,387 A | 7/1993 | Waters et al. | |
| 5,258,755 A | 11/1993 | Kuckes | |
| 5,305,212 A | 4/1994 | Kuckes | |
| 5,485,089 A | 1/1996 | Kuckes | |
| 5,512,830 A | 4/1996 | Kuckes | |
| 5,582,248 A | 12/1996 | Estes | |
| 5,589,775 A | 12/1996 | Kuckes | |
| 5,923,170 A | 7/1999 | Kuckes | |
| 6,179,066 B1 | 1/2001 | Nasr et al. | |
| 6,525,540 B1 | 2/2003 | Kong et al. | |
| 6,985,814 B2 | 1/2006 | Mcelhinney | |
| 7,268,552 B1 | 9/2007 | Gerald, II et al. | |
| 7,703,548 B2 | 4/2010 | Clark | |
| 7,719,282 B2 | 5/2010 | Fanini et al. | |
| 7,866,386 B2 | 1/2011 | Beer et al. | |
| 7,962,287 B2 | 6/2011 | Clark | |
| 7,969,819 B2 | 6/2011 | Hall et al. | |
| 8,011,451 B2 | 9/2011 | MacDonald | |
| 8,126,650 B2 | 2/2012 | Lu et al. | |
| 8,237,443 B2 | 8/2012 | Hopmann et al. | |
| 8,324,912 B2 | 12/2012 | Waid | |
| 8,462,012 B2 | 6/2013 | Clark et al. | |
| 8,680,866 B2 | 3/2014 | Marsala et al. | |
| 8,749,243 B2 | 6/2014 | Bittar et al. | |
| 8,844,648 B2 | 9/2014 | Bittar et al. | |
| 9,404,354 B2 * | 8/2016 | Sugiura .................. E21B 44/00 | |
| 9,581,718 B2 | 2/2017 | Rodney | |
| 9,702,240 B2 | 7/2017 | Bittar et al. | |
| 2002/0000808 A1 | 1/2002 | Nichols | |
| 2003/0137297 A1 | 7/2003 | Ganesan | |
| 2004/0163443 A1* | 8/2004 | McElhinney ......... E21B 47/022 73/1.79 | |
| 2005/0218898 A1 | 10/2005 | Fredette et al. | |
| 2006/0113112 A1 | 6/2006 | Waters | |
| 2006/0131013 A1 | 6/2006 | Mcelhinney | |
| 2007/0126426 A1 | 6/2007 | Clark et al. | |
| 2007/0187089 A1 | 8/2007 | Bridges | |
| 2008/0000686 A1 | 1/2008 | Kuckes et al. | |
| 2008/0177475 A1 | 7/2008 | Mcelhinney et al. | |
| 2008/0275648 A1 | 11/2008 | Illfelder | |
| 2009/0164127 A1* | 6/2009 | Clark ................ E21B 47/02216 702/7 |
| 2009/0178850 A1 | 7/2009 | Waters et al. | |
| 2009/0260878 A1 | 10/2009 | Morley et al. | |
| 2009/0308657 A1* | 12/2009 | Clark ................ E21B 47/02216 175/45 |
| 2010/0194395 A1 | 8/2010 | Mcelhinney | |
| 2010/0300756 A1* | 12/2010 | Bergstrom ............... G01V 3/26 175/45 |
| 2010/0332137 A1 | 12/2010 | Meadows et al. | |
| 2011/0015862 A1 | 1/2011 | Sato et al. | |
| 2011/0018542 A1 | 1/2011 | Clark et al. | |
| 2011/0088890 A1 | 4/2011 | Clark | |
| 2011/0284731 A1 | 11/2011 | Roscoe et al. | |
| 2011/0290011 A1 | 12/2011 | Dowla et al. | |
| 2011/0308794 A1 | 12/2011 | Bittar et al. | |
| 2011/0308859 A1 | 12/2011 | Bittar et al. | |
| 2011/0309836 A1 | 12/2011 | Bittar et al. | |
| 2012/0001637 A1 | 1/2012 | Bittar et al. | |
| 2012/0013339 A1 | 1/2012 | Kuckes et al. | |
| 2012/0109527 A1 | 5/2012 | Bespalov et al. | |
| 2012/0139543 A1 | 6/2012 | McElhinney et al. | |
| 2012/0158305 A1 | 6/2012 | Rodney et al. | |
| 2012/0257475 A1 | 10/2012 | Luscombe et al. | |
| 2012/0273192 A1 | 11/2012 | Schmidt et al. | |
| 2012/0283951 A1 | 11/2012 | Li et al. | |
| 2012/0283952 A1 | 11/2012 | Tang et al. | |
| 2013/0056272 A1 | 3/2013 | Kuckes | |
| 2013/0068526 A1 | 3/2013 | Snyder et al. | |
| 2013/0069655 A1 | 3/2013 | McElhinney et al. | |
| 2013/0151158 A1 | 6/2013 | Brooks et al. | |
| 2013/0173164 A1 | 7/2013 | Zhang | |
| 2013/0184995 A1 | 7/2013 | Sinclair et al. | |
| 2013/0333946 A1 | 12/2013 | Sugiura | |
| 2014/0132272 A1 | 5/2014 | Cuevas et al. | |
| 2014/0145857 A1 | 5/2014 | Comparetto | |
| 2014/0191120 A1 | 7/2014 | Donderici et al. | |
| 2014/0374159 A1 | 12/2014 | Mcelhinney et al. | |
| 2015/0013968 A1 | 1/2015 | Hsu et al. | |
| 2015/0124562 A1* | 5/2015 | Yoneshima ............... G01V 1/40 367/25 |
| 2015/0240623 A1 | 8/2015 | Blangé et al. | |
| 2015/0361789 A1* | 12/2015 | Donderici ................ G01V 3/30 367/82 |
| 2015/0378044 A1 | 12/2015 | Brooks | |
| 2016/0216396 A1 | 7/2016 | Golla et al. | |
| 2016/0258275 A1 | 9/2016 | Wu et al. | |
| 2016/0258276 A1 | 9/2016 | Donderici et al. | |
| 2016/0273338 A1 | 9/2016 | Wu | |
| 2016/0273339 A1 | 9/2016 | Wu | |
| 2016/0273340 A1 | 9/2016 | Roberson et al. | |
| 2016/0273341 A1 | 9/2016 | Wu et al. | |
| 2016/0273342 A1 | 9/2016 | Wu et al. | |
| 2016/0273343 A1 | 9/2016 | Donderici et al. | |

FOREIGN PATENT DOCUMENTS

| | | | |
|---|---|---|---|
| WO | WO-2013/162505 A1 | 10/2013 | |
| WO | WO-2014/089402 A2 | 6/2014 | |
| WO | WO-2016/025230 A1 | 2/2016 | |
| WO | WO-2016/025232 A1 | 2/2016 | |
| WO | WO-2016/025235 A1 | 2/2016 | |
| WO | WO-2016/025237 A1 | 2/2016 | |
| WO | WO-2016/025238 A1 | 2/2016 | |
| WO | WO-2016/025241 A1 | 2/2016 | |
| WO | WO-2016/025245 A1 | 2/2016 | |
| WO | WO-2016/025247 A1 | 2/2016 | |

OTHER PUBLICATIONS

"International Application Serial No. PCT/US2015/043639, Written Opinion dated Oct. 27, 2015", 10 pgs.

Definition of well head accessed through Schlumberger Oilfield Glossary on Nov. 15, 2016 via http://www.glossary.oilfield.slb.com/Terms/w/wellhead.aspx, 2 pages.

(56) References Cited

OTHER PUBLICATIONS

Definition of cement accessed through Schlumberger Oilfield Glossary on Nov. 15, 2016 via http://www.glossary.oilfield.slb.com/Terms/c/cement.aspx, 3 pages.
"International Application Serial No. PCT/US2015/043557, International Search Report dated Oct. 19, 2015", 3 pgs.
"International Application Serial No. PCT/US2015/043557, Written Opinion dated Oct. 19, 2015", 5 pgs.
"International Application Serial No. PCT/US2015/043566, International Search Report dated Oct. 26, 2015", 3 pgs.
"International Application Serial No. PCT/US2015/043566, Written Opinion dated Oct. 26, 2015", 11 pgs.
"International Application Serial No. PCT/US2015/043577, International Search Report dated Oct. 21, 2015", 3 pgs.
"International Application Serial No. PCT/US2015/043577, Written Opinion dated Oct. 21, 2015", 9 pgs.
"International Application Serial No. PCT/US2015/043580, International Search Report dated Nov. 11, 2015", 3 pgs.
"International Application Serial No. PCT/US2015/043580, Written Opinion dated Nov. 11, 2015", 9 pgs.
"International Application Serial No. PCT/US2015/043587, International Search Report dated Oct. 26, 2015", 3 pgs.
"International Application Serial No. PCT/US2015/043587, Written Opinion dated Oct. 26, 2015", 11 pgs.
"International Application Serial No. PCT/US2015/043604, International Search Report dated Oct. 28, 2015", 3 pgs.
"International Application Serial No. PCT/US2015/043604, Written Opinion dated Oct. 28, 2015", 14 pgs.
"International Application Serial No. PCT/US2015/043621, International Search Report dated Oct. 19, 2015", 3 pgs.
"International Application Serial No. PCT/US2015/043621, Written Opinion dated Oct. 19, 2015", 5 pgs.
CA First Exam Report; Application serial No. 2,954,723; dated Dec. 5, 2017, 3 pages.
CA First Exam Report; Application Serial No. 2,954,303; dated Nov. 29, 2017, 4 pages.
CA First Exam Report; Application Serial No. 2,954,301; dated Nov. 29, 2017, 5 pages.
CA Application Serial No. 2954674, Examiner's Letter, dated Dec. 12, 2017, 3 pages.
CA application serial No. 2954726 Examiner's Letter dated Dec. 12, 2017, 3 pages.
GCC Application Serial No. 2015/29857; GCC Examination Report; dated Jan. 23, 2018.
GCC Application Serial No. 2015/29874; GCC Examination Report; dated Jan. 23, 2018, 6 pages.
GCC Application Serial No. 2015/29873; GCC Examination Report; dated Feb. 8, 2018, 8 pages.
GCC Application Serial No. 2015/29856, GCC Examination Report; dated Jan. 23, 2018.
GCC Application Serial No. 2015/29871, GCC Examination Report, dated Feb. 28, 2018, 5 Pages.
Canadian Application Serial No. 2,954,301; Examiner's Letter; dated Jun. 1, 2018, 6 pages.
Canadian Application Serial No. 2,954,657; Examiner's Letter; dated Jun. 5, 2018, 4 pages.
Canadian Application Serial No. 2,954,668; Examiner's Letter; dated Jun. 6, 2018, 4 pages.
GCC Application Serial No. 2015/29856; Second Examination Report; dated Jun. 24, 2018, 3 pages.
GCC Application Serial No. 2015/29857; Second Examination Report; dated Jun. 24, 2018, 3 pages.
GCC Application Serial No. 2015/29873; Second Examination Report; dated Jun. 24, 2018, 3 pages.
GCC Application Serial No. 2015/29871; 2nd Examination Letter: dated Aug. 30, 2018, 4 pages.
GCC Application Serial No. 2015/29874; Second Examination Report; dated Jun. 24, 2018, 4 pages.
Canadian Application Serial No. 2,954,303; Examiner's Letter; dated Jul. 24, 2018, 5 pages.
Canadian Application No. 2,954,666; Examiner's Letter; dated Jul. 30, 2018, 6 pages.
"U.S. Appl. No. 14/769,476, Restriction Requirement dated Aug. 12, 2016", 9 pgs.
"U.S. Appl. No. 14/769,539, Non Final Office Action dated Aug. 5, 2016", 32 pgs.
Van Dongen, Koen W. A., "A Directional Borehole Radar System for Subsurface Imaging", DUP Science, (2002), 111 pgs.
GCC Application Serial No. 2015/29872; Examination Report; dated Nov. 22, 2018, 4 pages.
CA Application Serial No. 2,954,301, Office Action 3, dated Mar. 1, 2019, 5 pages.
CA Application Serial No. 2,954,668, Office Action, dated Mar. 5, 2019, 5 pages.
CA Application Serial No. 2,954,657; Examiner's Letter; dated Dec. 5, 2017, 3 pages.
CA Application Serial No. 2,954,668; Examiner's Letter; dated Dec. 12, 2017, 5 pages.
GCC Application Serial No. 2015/29861; GCC Examination Report; dated Jan. 23, 2018, 5 pages.
GCC Application Serial No. 2015/29864; GCC Examination Report; dated Nov. 22, 2018, 5 pages.
U.S. Appl. No. 14/769,512; Final Office Action; dated May 3, 2019, 19 pages.
U.S. Appl. No. 14/769,533; Non-Final Office Action; dated Apr. 26, 2019, 33 pages.
CA Application No. 2,954,666; Examiner's Letter; dated Apr. 17, 2019, 5 pages.
U.S. Appl. No. 14/769,539; Final Office Action; dated Dec. 7, 2017, 23 pages.
U.S. Appl. No. 15/666,137; Non-Final Office Action; dated Dec. 5, 2018, 42 pages.
CA Application Serial No. 2,954,303, Office Action, dated Apr. 24, 2019, 5 pages.
U.S. Appl. No. 14/769,512, Notice of Allowance, dated Aug. 14, 2019, 9 pages.
U.S. Appl. No. 14/769,539, Non-Final Office Action, dated Aug. 7, 2019, 25 pages.
U.S. Appl. No. 15/666,137, Non-Final Office Action, dated Jun. 24, 2019, 6 pages.

* cited by examiner

WELL RANGING APPARATUS, SYSTEMS, AND METHODS

CROSS-REFERENCE TO RELATED APPLICATIONS

The present application is a U.S. National Stage Filing under 35 U.S.C. 371 from International Application No. PCT/US2015/043639, filed on 4 Aug. 2015, which application claims the benefit of priority to provisional application Ser. No. 62/035,877, filed Aug. 11, 2014; provisional application Ser. No. 62/037,440, filed Aug. 14, 2014; and provisional application Ser. No. 62/078,732, filed Nov. 12, 2014; each of which is incorporated herein by reference in its entirely.

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

DETAILED DESCRIPTION

Introduction

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cabling and equipment. When surface excitation is used, a current is injected into a target well casing at the surface of the well (e.g., at the well head). The current travels along the casing down-hole and generates a magnetic field down-hole that originates from the target via direct transmission, and can be measured at a distance (e.g., in a drilling well) for ranging purposes. As a result, the excitation signal down-hole may be relatively weak when the distance beneath the surface is great, due to the current leakage into the conductive formation. Consequently, sensor noise often affects magnetic ranging accuracy at greater depths, leading to false signal measurements and failures in well location. Some of the embodiments described herein are designed to improve down-hole current strength and/or enhance the signal/noise ratio, for improved accuracy with respect to ranging measurement technology.

Such apparatus, methods, and systems can be even more useful when backscatter ranging is used: that is, when the excitation source is injected into the casing of the drilling well, or is attached to a drill string within the drilling well. In the case of backscatter ranging, the excitation source originates a direct transmission signal that impinges upon, and is then reflected from, the target well. When these backscatter transmission signals are received at a receiver in the drilling well, the resulting received ranging signals are even weaker than in the direct transmission case.

Thus, novel apparatus, methods, and systems are proposed to increase the strength of the received ranging signal, to improve the received signal-to-noise ratio (SNR), and to improve the accuracy of ranging signal measurements. In some embodiments, enhancements are realized in all three of these areas. By taking this approach, ranging system technology can be improved in a number of ways, via improved accuracy and reliability of individual ranging measurements. Therefore, the apparatus, methods, and systems proposed herein can be used to reduce measurement issues that arise due to noise, as well as to generate larger signals at great depths. The result is that the maximum detection ranges for existing ranging systems can be significantly improved. In some embodiments, the apparatus, methods, and systems described herein can be applied to electromagnetic (EM) telemetry applications.

Figure 1:
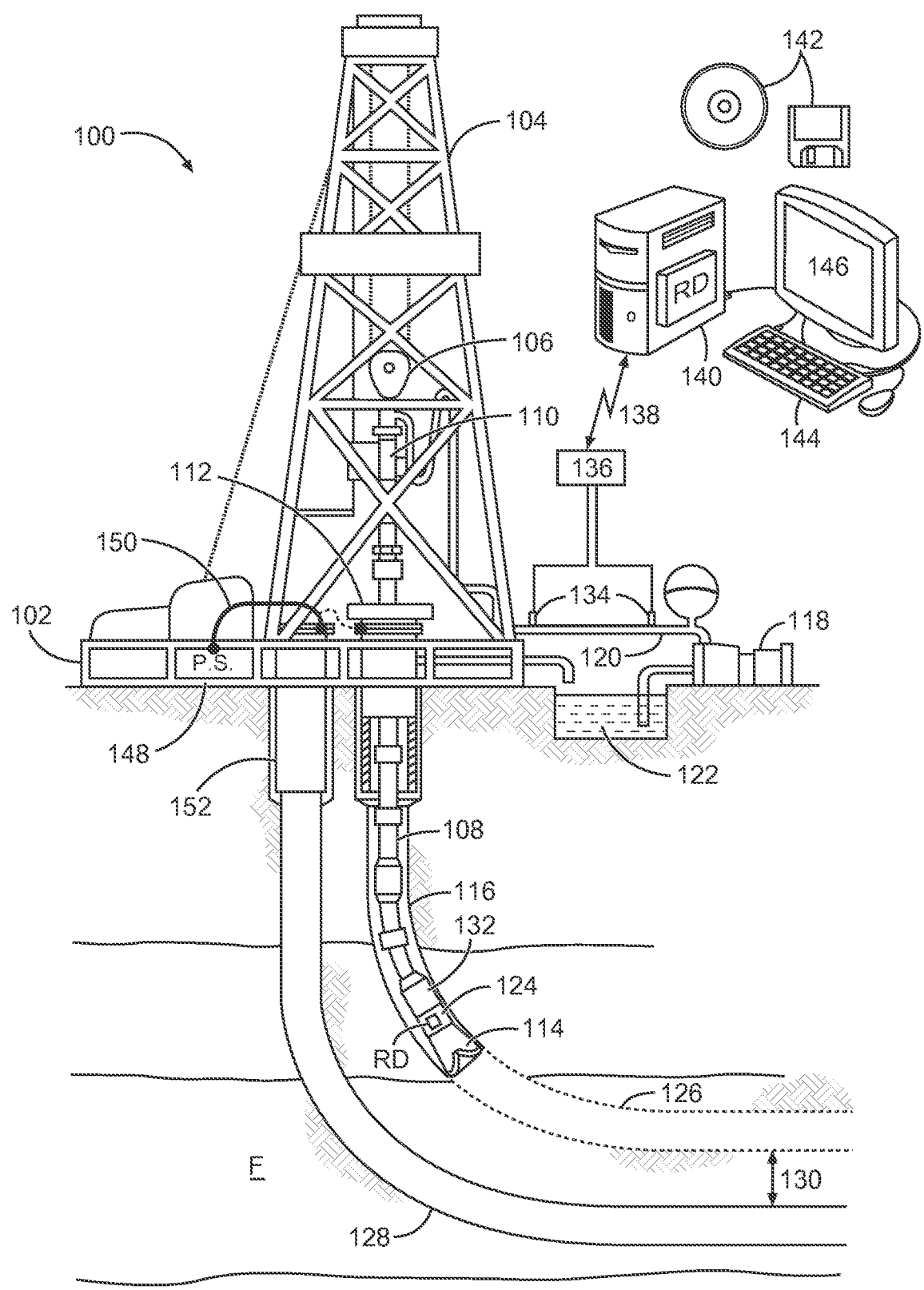
FIG. 1 depicts an example drilling environment in which ranging embodiments may be employed.
Figure 2:
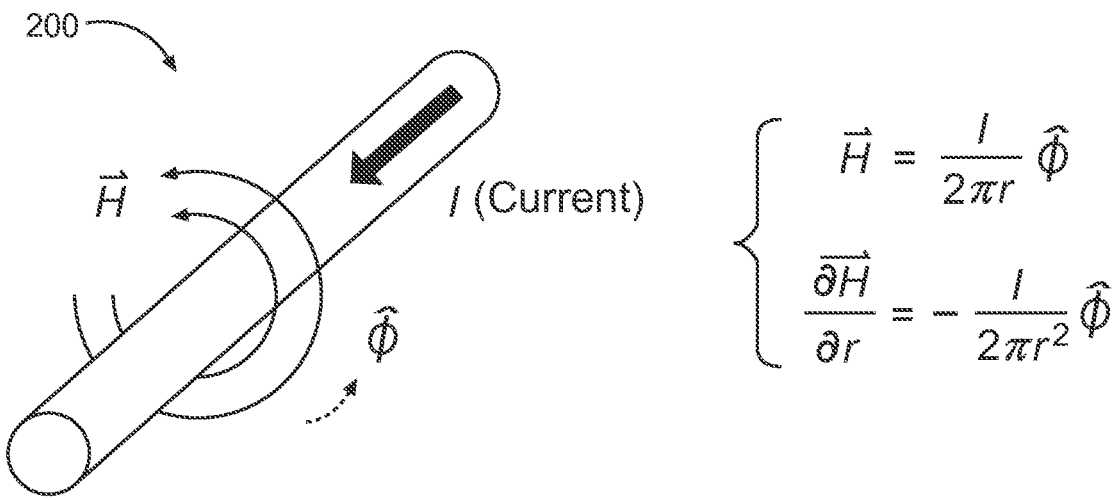
FIGS. 2 to 9 illustrate a variety of apparatus, method, and system configurations for various range determination embodiments.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly (BHA) that includes one or more drill collars (comprising thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The BHA further includes a ranging tool 124 to receive signals from current injected by a power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

The ranging tool 124 may comprise one or more elements, interchangeably designated as receivers or sensors in this document. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the BHA. In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 or the tool 124, and may be used to implement any of the methods described herein.

Thus, FIG. 1 illustrates an electromagnetic ranging system with surface excitation. The power supply 148 at the surface employs a cable 150 to inject current into target well casing 152 and flowing down-hole so that magnetic fields can be generated surrounding a target well 128. Then sensors in the ranging tool 124 in the drilling well 126 can determine the magnetic field strength in various directions so that distance and direction between the target well 128 and drilling well 126 can be determined. The power supply 148 can also be connected to inject current into the casing of the drilling well 126, or be disposed downhole in either the drilling well 126 (shown) or the target well 128 (not shown in this figure).

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

When conventional ranging systems are used in a two-sensor ranging configuration, with the sensors located in the same azimuthal plane, the tool may go through a variety of spatial orientations, and as a result, the tool face angle may not be known. Thus, it may be difficult to determine the range between wells, which comprises the ranging distance and the ranging direction.

As a solution to this technical problem, the inventors have developed a variety of apparatus, systems, and methods. These will be explained in the context of apparatus, systems, and methods that operate to process gradient field measurements from two or more separated sensors. These measurements may be used to determine the relative distance between the tool center and a target line source, such as the approximate range between a drilling well and a target well. Thus, the apparatus, methods, and systems described herein are applicable to magnetic ranging applications, including steam-assisted gravity drainage (SAGD) application, well avoidance, and well interception operations. The result of implementing various embodiments may be improved accuracy. Several embodiments that may provide some of these advantages will now be described.

Detailed Presentation

In some embodiments, when the ranging direction is not known, a set of two sensors, such as magnetometers, can be rotated by a selected number of degrees in the azimuthal direction (e.g., 10, 20, 30, 40, 50, 60, 70, 80, or 90 degrees, or more), where the number of degrees of rotation corresponds to the applied methodology, to gain additional measurement information. In some embodiments, an additional sensor is provided, and located some number of degrees away from the original sensor(s) in the azimuthal direction. The additional information provided by the rotated sensors (or one or more additional sensors) can be used to determine the range between wells, without knowing the angle Theta $\Theta$ to the target well. For example, the number of degrees for rotation can be selected to provide a threshold gradient field magnitude, given the magnitude of the measured field strength signals from one or more sensors in one or more azimuthal locations. The number of degrees for rotation can also be selected to provide a threshold gradient field magnitude above a determined noise level, which can be determined using each of the sensors, as will become apparent to those of ordinary skill in the art after reading the content of this disclosure.

In some embodiments, apparatus, systems, and methods use two sensors (e.g., magnetometers) to measure the gradient field, where the two sensors are attached to a logging tool and separated by a known distance. The processing methods described herein may be based on (1) total field measurement, (2) the tangential field component, and/or (3) the normal field component of the sensor measurements to determine the range distance R between wells, even when the ranging direction is unknown. These methods can be applied to three or more sensors. In many embodiments, the vector sum of the normal component and the tangential component and/or the longitudinal component provides the total field component.

Initial Calculations to Determine Range

FIGS. 2 to 9 illustrate a variety of apparatus, method, and system configurations for various range determination embodiments. To begin, the reader is referred to FIG. 2, which shows the magnetic field H for an infinite line source 200 characterized by a constant current I. Based on Ampere's law, the magnetic field H at low frequency surrounding the line source 200 may be expressed as:

$$\vec{H} = \frac{I}{2\pi r}\hat{\Phi}, \tag{1}$$

where r is the distance between a measurement point and the infinite line source 200. In addition, the gradient field can be given by $$\frac{\partial \vec{H}}{\partial r} = -\frac{I}{2\pi r^2}\hat{\Phi}. \tag{2}$$

Consequently, the distance r can be directly computed by taking the ratio of the amplitude of Equation (1) to the amplitude of Equation (2), given by:

$$\left|\frac{\vec{H}}{\frac{\partial \vec{H}}{\partial r}}\right| = \left|\frac{\frac{I}{2\pi r}}{\frac{-I}{2\pi r^2}}\right| = r. \tag{3}$$

Figure 3:
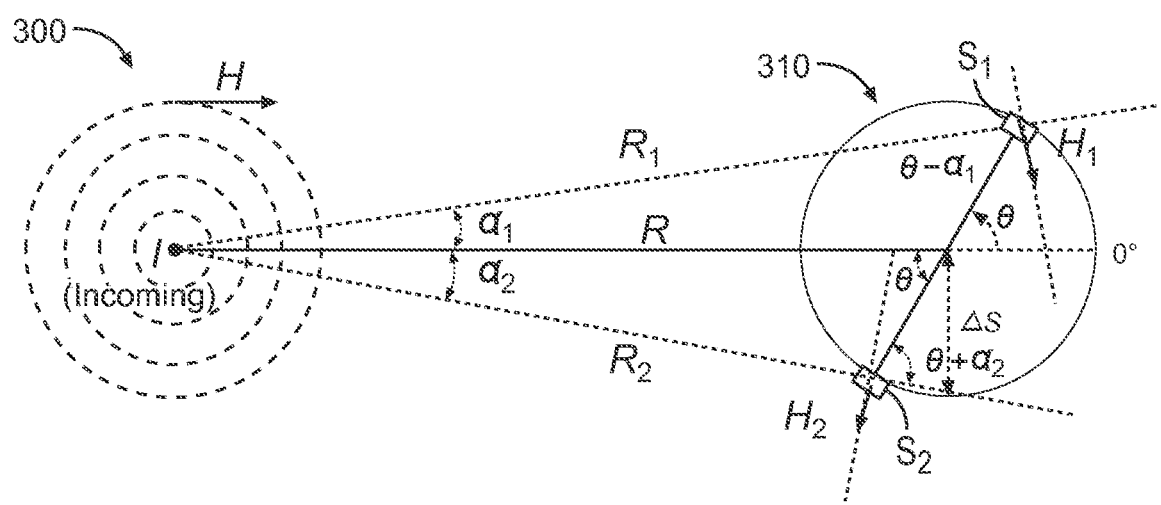

Equation (3) may be designated as the gradient method to compute a ranging distance. In practice, two sensors (e.g., magnetometers) may be used to compute magnetic field and gradient field measurements, as shown in FIG. 3, which presents diagram of an infinite line source 300 and a logging tool 310 equipped with two sensors S1, S2 for gradient field determination.

A finite difference method can be utilized to calculate the magnetic field strength H and the gradient field strength, as given by $$\vec{H} = \frac{\vec{H}_1 + \vec{H}_2}{2}, \tag{4a}$$

and $$\frac{\partial \vec{H}}{\partial r} = \frac{\vec{H}_1 - \vec{H}_2}{2\Delta S}, \tag{4b}$$

where $H_1$ and $H_2$ are the total field measurements at sensors S1 and S2, respectively. $\Delta S$ is the separation between each sensor and the tool center. Consequently, Equation (3) can be modified based on the finite difference method to compute the ranging distance r as $$r = \left|\frac{\frac{\vec{H}_1 + \vec{H}_2}{2}}{\frac{\vec{H}_1 - \vec{H}_2}{2\Delta S}}\right|. \tag{5}$$

However, as part of operations in the field, the location of the tool face varies while drilling. The tool face is the angle between a fixed reference point on a down hole tool and either the high side of the tool in the well, or magnetic North, and may be designated arbitrarily. Related to the tool face is the ranging direction, which may be designated as the angle theta θ in FIG. 3. If sensor S1 does not lie on a straight line R between the line source point and the tool center (meaning the ranging direction θ shown in the figure is not zero), then Equations (4) and (5) are not valid. The value of the ranging direction θ will affect the value of total field strength and direction measurements. Without taking this ranging direction θ into consideration, conventional gradient calculations may fail to provide an accurate ranging distance.

Processing Methods Based on Total Field Measurements

To adjust the effects of the change in the ranging direction θ, ranging calculations based on total field measurements of each sensor will be considered. For this discussion, each sensor is assumed to measure three orthogonal field components to acquire a total field measurement. The three orthogonal field components are: the normal component, the tangential component, and the z component shown for the downhole tool housing 400 in FIG. 4.

Figure 4:
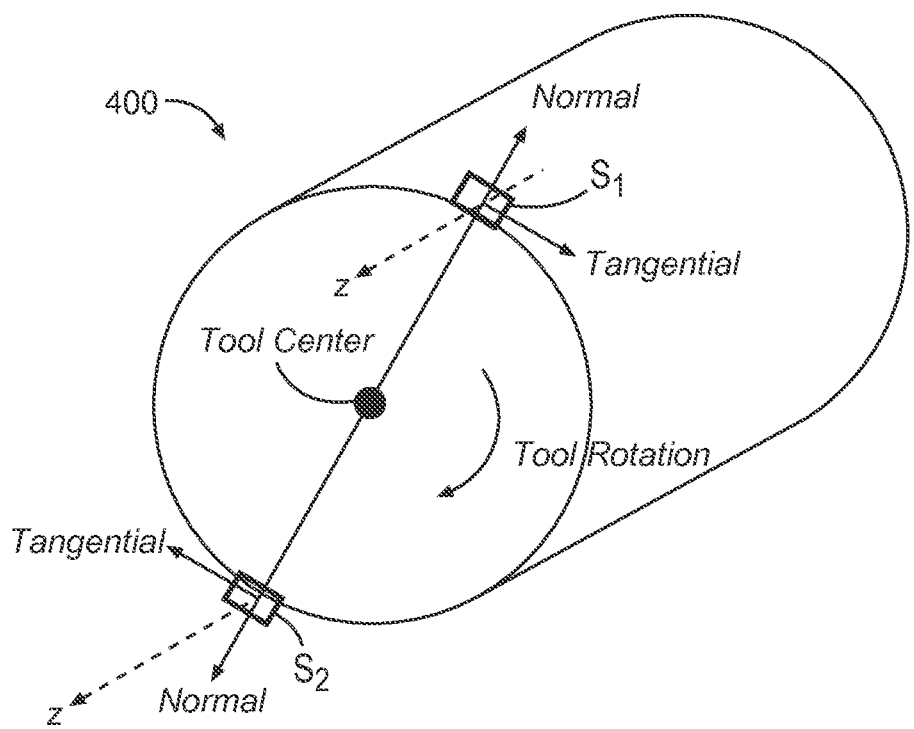

In FIG. 4, the normal component and the tangential component are in the tool azimuthal plane. The direction of the tangential component is in the tool rotation direction, whereas the normal direction that is perpendicular to tool rotation points away from the tool center and lies on a straight line between the tool center and the location of Sensor 1. The longitudinal z component is parallel to the tool mandrel along with the BHA. Thus, the z component is parallel to the longitudinal axis of the tool.

Figure 5:
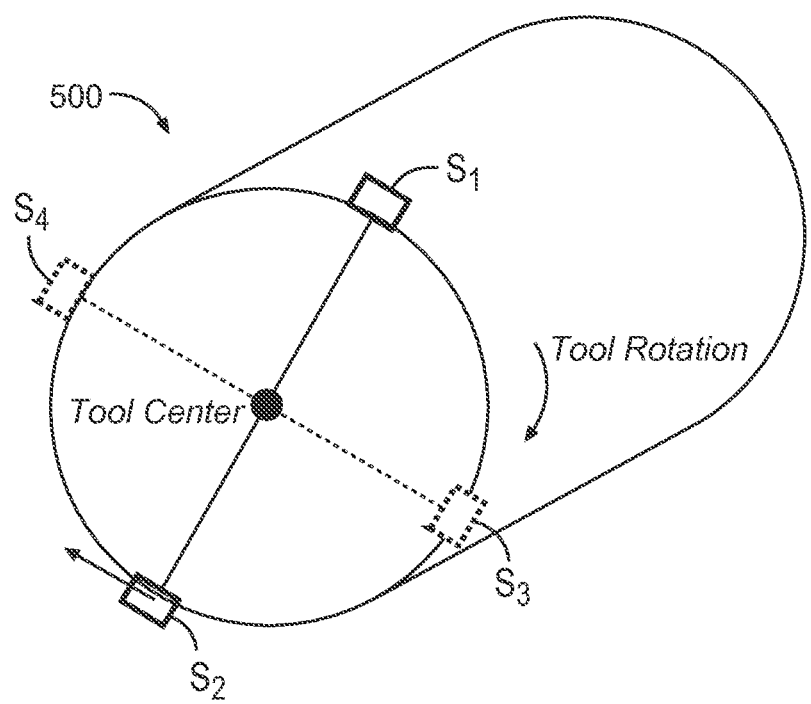

For simplicity in the calculations that follow, the sensors S1 and S2 are oriented 180° away from each other, attached to a housing 500, such as a logging tool, as shown in FIG. 5, and are utilized to determine the ranging distance R. $\Delta S$ represents the separation between each of the sensors and the tool center, such that the sensors S1 and S2 are separated by a distance of $2\Delta S$. Therefore, the total field measured at sensor S1 can be expressed as $$H_1 = \frac{I}{2\pi R_1} = \frac{I}{2\pi\sqrt{R^2 + \Delta S^2 + 2R\Delta S\cos\theta}}, \tag{6}$$

whereas the total field measured at sensor S2 is given by $$H_2 = \frac{I}{2\pi R_2} = \frac{I}{2\pi\sqrt{R^2 + \Delta S^2 - 2R\Delta S\cos\theta}}, \tag{7}$$

where $$R_1 = \sqrt{R^2 + \Delta S^2 + 2R\Delta S\cos\theta}, \text{ and} \tag{8}$$

$$R_2 = \sqrt{R^2 + \Delta S^2 - 2R\Delta S\cos\theta}. \tag{9}$$

Using the finite difference method, Equations (4a) and (4b) can be modified as shown, to produce Equations (10) and (11) below, respectively:

$$H = \frac{H_1 + H_2}{2} = \frac{I}{4\pi}\left(\frac{1}{R_1} + \frac{1}{R_2}\right) = \frac{I}{4\pi R_1 R_2}(R_1 + R_2), \quad (10)$$

and $$\frac{\partial H}{\partial r} = \frac{\Delta H}{2\Delta S} = \frac{H_1 - H_2}{2\Delta S} = \frac{I}{4\pi\Delta S}\left(\frac{1}{R_1} - \frac{1}{R_2}\right) = \frac{I}{4\pi\Delta S R_1 R_2}(R_2 - R_1). \quad (11)$$

Then, taking the ratio of Equation (10) to Equation (11) gives:

$$\frac{H}{\frac{\Delta H}{2\Delta S}} = \frac{\frac{H_1 + H_2}{2}}{\frac{H_1 - H_2}{2\Delta S}} = \Delta S\frac{(R_1 + R_2)}{(R_2 - R_1)} = \Delta S\frac{R_1^2 + R_2^2 + 2R_1 R_2}{R_2^2 - R_1^2}. \quad (12)$$

Applying Equations (8) and (9) to simplify the expression of Equation (12) renders Equation (13) as:

$$\frac{\frac{H_1 + H_2}{2}}{\frac{H_1 - H_2}{2\Delta S}} = \frac{R}{-2\cos\theta}\left(1 + \left(\frac{\Delta S}{R}\right)^2 + \sqrt{1 + \left(\frac{\Delta S}{R}\right)^4 - 2\left(\frac{\Delta S}{R}\right)^2 \cos(2\theta)}\right). \quad (13)$$

The left side of Equation (13) can be calculated based on the measurements of $H_1$ and $H_2$ and the known distance $\Delta S$. The right side of Equation (13) has two unknown parameters: the ranging direction $\theta$ and the ranging distance R. However, the ranging direction $\theta$ can be calculated when each sensor operates to acquire both tangential and normal components of the magnetic field. Consequently, the ranging distance R can be directly computed from Equation (13) when the ranging direction $\theta$ is known.

Generally speaking, the sensor separation for a down hole tool is much smaller than the ranging distance to be measured, indicating that the value of the ratio $$\frac{\Delta S}{R}$$

is much smaller than 1. Taking this fact into account, Equation (13) can often be simplified as:

$$\frac{H}{\frac{\Delta H}{2\Delta S}} = \frac{\frac{H_1 + H_2}{2}}{\frac{H_1 - H_2}{2\Delta S}} \approx \frac{R}{-\cos\theta}. \quad (14)$$

For the following discussion, two sensors (sensor S1 and S2 in FIG. 5) are designated as the first pair of gradient sensors. If a logging tool is equipped with a second pair of gradient sensors that are azimuthally oriented 90 degrees away from the first pair (as shown for sensors S3, S4 in FIG. 5, such that $\theta \to \theta + 90°$ in FIG. 3), then the second pair of gradient sensors will be able to obtain a measurement illustrated by Equation (15), as follows:

$$\frac{H}{\frac{\Delta H}{2\Delta S_{Pair2}}} \approx \frac{R}{\sin\theta}. \quad (15)$$

Therefore, Equation (16) can be used to directly calculate the ranging distance R without taking the ranging direction $\theta$ into consideration:

$$\sqrt{\frac{1}{\left(\frac{\Delta H}{\frac{2\Delta S}{H}}\right)^2_{Pair1} + \left(\frac{\Delta H}{\frac{2\Delta S}{H}}\right)^2_{Pair2}}} = \sqrt{\frac{1}{\frac{\cos^2\theta}{R^2} + \frac{\sin^2\theta}{R^2}}} = R \quad (16)$$

Of course, the ranging direction $\theta$ can be also determined by taking the ratio between Equations (14) and (15), as noted previously.

In some embodiments, the second pair of gradient sensors (sensors S3 and S4) are not physically installed in the logging tool to enable the use of Equation (16). Instead, owing to the conditions surrounding logging while drilling (LWD) or measurement while drilling (MWD) services, sensors S1 and S2 can be used to make stationary measurements at a first tool azimuth angle, and then, once the tool is rotated by 90 degrees (or some other angle) away from the first tool azimuth angle, a second set of stationary measurements can be made—which is the equivalent of taking measurements with a second pair of sensors S3, S4. The two sets of measurements taken at two different tool azimuth angles that are separated by 90 degrees (or some other angle) will also enable the use of Equation (16), without the use of four physical sensors.

Processing Methods Based on Tangential Component Measurements

Figure 6:
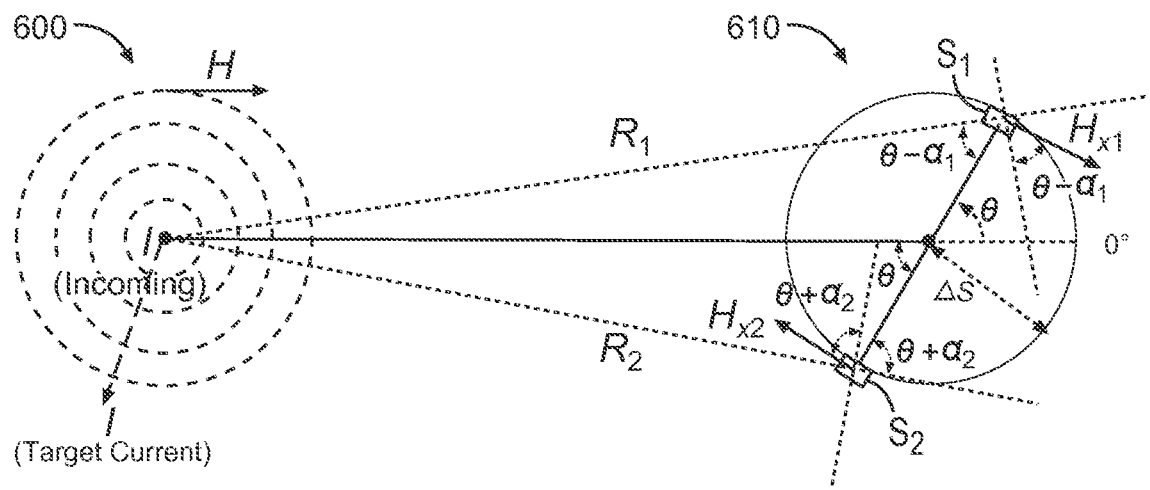

Instead of using the total field measurements discussed previously, one can determine a solution that uses only using tangential component measurements to provide a ranging distance calculation. For example, FIG. 6 presents an infinite line source 600 and a tool housing 610, such as a logging tool, equipped with two sensors S1, S2 for tangential field determination. $H_{x1}$ and $H_{x2}$ indicate the tangential component received at sensors S1 and S2, respectively. $R_1$ and $R_2$ are the shortest distances between the line source and sensors S1 and S2, respectively.

Therefore, $H_{x1}$ and $H_{x2}$ can be expressed as $$H_{x1} = H_1\cos(\theta - \alpha_1) = \quad (17a)$$
$$\frac{I}{2\pi R_1}(\cos\theta\cos\alpha_1 + \sin\theta\sin\alpha_1) = \frac{I}{2\pi R_1^2}(R\cos\theta + \Delta S),$$

and $$H_{x2} = -H_2\cos(\theta + \alpha_2) = \quad (17b)$$
$$\frac{-I}{2\pi R_2}(\cos\theta\cos\alpha_2 - \sin\theta\sin\alpha_2) = \frac{-I}{2\pi R_2^2}(R\cos\theta - \Delta S),$$

where $$\cos\alpha_1 = \frac{R + \Delta S\cos\theta}{R_1}, \quad (18a)$$

$$\sin\alpha_1 = \frac{\Delta S\sin\theta}{R_1}, \quad (18b)$$

$$\cos\alpha_2 = \frac{R - \Delta S\cos\theta}{R_2}, \quad (18c)$$

-continued $$\sin\alpha_2 = \frac{\Delta S \sin\theta}{R_2}, \quad (18d)$$

$$R_1^2 = (R + \Delta S\cos\theta)^2 + (\Delta S\sin\theta)^2 = R^2 + \Delta S^2 + 2R\Delta S\cos\theta, \quad (19a)$$

and $$R_2^2 = (R - \Delta S\cos\theta)^2 + (\Delta S\sin\theta)^2 = R^2 + \Delta S^2 - 2R\Delta S\cos\theta. \quad (19b)$$

As was accomplished with respect to Equations (10) and (11) above, Equations (20) and (21) can be calculated based on tangential components as:

$$H = \frac{H_{x1} - H_{x2}}{2} = \frac{I}{4\pi R_1^2 R_2^2}[R\cos\theta(R_1^2 + R_2^2) + \Delta S(-R_1^2 + R_2^2)] = \quad (20)$$

$$\frac{IR\cos\theta}{2\pi R_1^2 R_2^2}(R^2 - \Delta S^2),$$

and $$\frac{\Delta H}{2\Delta S} = \frac{H_{x1} + H_{x2}}{2\Delta S} = \frac{I}{4\pi\Delta S R_1^2 R_2^2}[R\cos\theta(-R_1^2 + R_2^2) + \Delta S(R_1^2 + R_2^2)] = \quad (21)$$

$$\frac{-I}{2\pi R_1^2 R_2^2}(R^2\cos 2\theta - \Delta S^2)$$

At this point, Equation (22) can be obtained by taking the ratio of Equation (20) to Equation (21), as:

$$\frac{H}{\frac{\Delta H}{2\Delta S}} = \frac{R\cos\theta(R^2 - \Delta S^2)}{-(R^2\cos 2\theta - \Delta S^2)}. \quad (22)$$

From Equation (22), the ranging distance R can be calculated based on the tangential component measurements of H and ΔH, the calculated angle θ, and the known separation of ΔS. However, it is noted that in this case both tangential and normal components at each sensor are used to calculate the ranging direction θ. To avoid the use of the ranging direction θ in the calculation, a second pair of gradient sensors (e.g., sensors S3, S4) is utilized to provide measurements, to obtain an answer from Equation (23), as:

$$\frac{H}{\frac{\Delta H}{2\Delta S}}\text{Pair}2 = \frac{-R\sin\theta(R^2 - \Delta S^2)}{-(-R^2\cos 2\theta - \Delta S^2)}. \quad (23)$$

At this point, there are two unknown parameters (θ and R) with two equations (Equations (22) and (23)). The ranging distance R and ranging direction θ can thus be determined by solving Equations (22) and (23) simultaneously, avoiding the use of normal component measurements at each sensor.

Processing Methods Based on Normal Component Measurements

In addition to determining the well separation distance, or range R using tangential components, the normal component can be also used directly to determine the ranging distance and direction.

Figure 7:
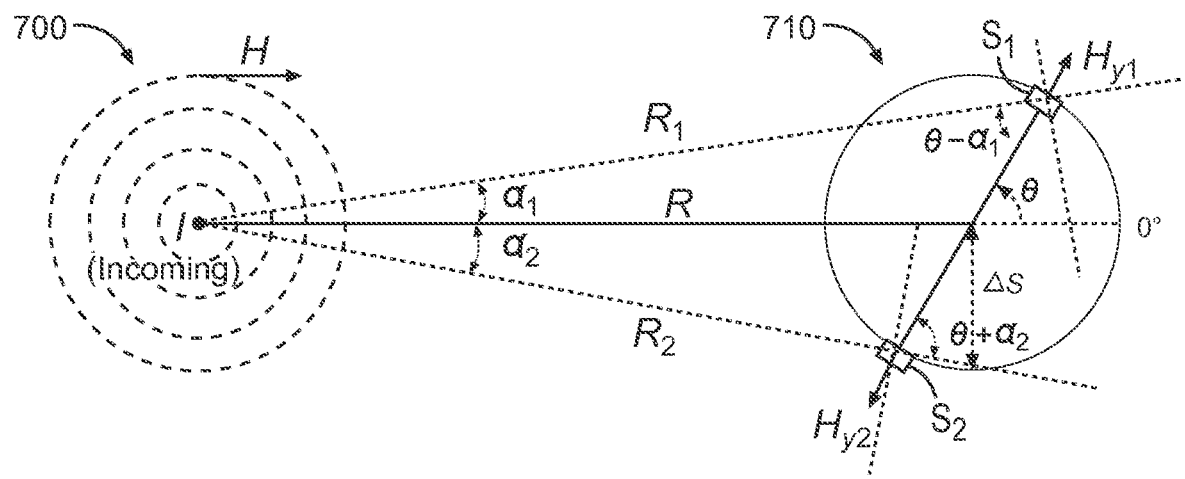

FIG. 7 presents an infinite line source 700 and a downhole tool housing 710, such as a logging tool, equipped with two sensors S1, S1 for normal field determination, and indicates $H_{y1}$ and $H_{y2}$ as normal component measurements received at the sensors S1 and S2, respectively. Using the same definitions provided previously, and Equations (18) and (19), $H_{y1}$ and $H_{y2}$ can be expressed as:

$$H_{y1} = \quad (24a)$$

$$-H_1\sin(\theta - \alpha_1) - \frac{-I}{2\pi R_1}(\sin\theta\cos\alpha_1 - \cos\theta\sin\alpha_1) = \frac{-I}{2\pi R_1^2}(R\sin\theta),$$

and $$H_{y2} = \quad (24b)$$

$$H_2\sin(\theta + \alpha_2) = \frac{I}{2\pi R_2}(\sin\theta\cos\alpha_2 + \cos\theta\sin\alpha_2) = \frac{I}{2\pi R_2^2}(R\sin\theta).$$

In a manner similar to that which was used for Equations (10) and (11), Equations (25) and (26) can be calculated based on the normal component as:

$$H = \frac{H_{y1} - H_{y2}}{2} = \quad (25)$$

$$\frac{-I}{2\pi R_1^2}(R\sin\theta) - \frac{I}{2\pi R_2^2}(R\sin\theta) = -\frac{2IR\sin\theta}{4\pi R_1^2 R_2^2}(R^2 + \Delta S^2),$$

And $$\frac{\Delta H}{2\Delta S} = \frac{H_{y1} + H_{y2}}{2\Delta S} = \quad (26)$$

$$\frac{-I}{4\Delta S\pi R_1^2}(R\sin\theta) + \frac{I}{4\Delta S\pi R_2^2}(R\sin\theta) = \frac{2IR\sin\theta}{4\pi R_1^2 R_2^2}(2R\cos\theta).$$

Taking the ratio of Equation (25) to Equation (26) leads to the formulation of Equation (27) as:

$$\frac{H}{\frac{\Delta H}{2\Delta S}} = -\frac{R^2 + \Delta S^2}{2R\cos\theta} = -\frac{R}{2\cos\theta}\left(1 + \left(\frac{\Delta S}{R}\right)^2\right). \quad (27)$$

As was accomplished with respect to tangential component calculations, Equation (27) can be used to calculate the ranging distance R based on normal component measurements of H and ΔH, the calculated angle θ, and the known separation distance of ΔS. Again, the tangential and normal components are used to calculate the ranging direction θ in this case. To avoid using this angle in the calculations for tangential component measurements, a second pair of gradient sensors, as shown in FIG. 4 of this section, may be utilized to make measurements and obtain and answer from Equation (28), as:

$$\frac{H}{\frac{\Delta H}{2\Delta S}}\text{Pair}2 = \frac{R}{2\sin\theta}\left(1 + \left(\frac{\Delta S}{R}\right)^2\right). \quad (28)$$

Consequently, the ranging direction θ can be obtained by taking the ratio between Equations (27) and (28), and thereafter the ranging distance R can be calculated from either Equation (27) or Equation (28). In addition, the ranging distance R can be also computed without knowing the ranging direction θ, based on Equation (29), as:

$$\sqrt{\frac{1}{\left(\frac{\frac{\Delta H}{2\Delta S}}{H}\right)^2_{\text{Pair}1} + \left(\frac{\frac{\Delta H}{2\Delta S}}{H}\right)^2_{\text{Pair}2}}} = \quad (29)$$

$$\sqrt{\frac{1}{\frac{4\cos^2\theta}{R^2}+\frac{4\sin^2\theta}{R^2}}\left(1+\left(\frac{\Delta S}{R}\right)^2\right)} = \frac{R}{2}\left(1+\left(\frac{\Delta S}{R}\right)^2\right).$$

For simplicity, Equation (30) may be used in some embodiments, since it is common for the value of the ratio $$\frac{\Delta S}{R}$$

to be much smaller than 1 under field conditions:

$$\sqrt{\frac{1}{\left(\frac{\Delta H}{2\Delta S}\right)^2_{Pair1}+\left(\frac{\Delta H}{2\Delta S}\right)^2_{Pair2}}} = \frac{R}{2}\left(1+\left(\frac{\Delta S}{R}\right)^2\right) \approx \frac{R}{2}. \tag{30}$$

Additional Sensor Configurations

Figure 8:
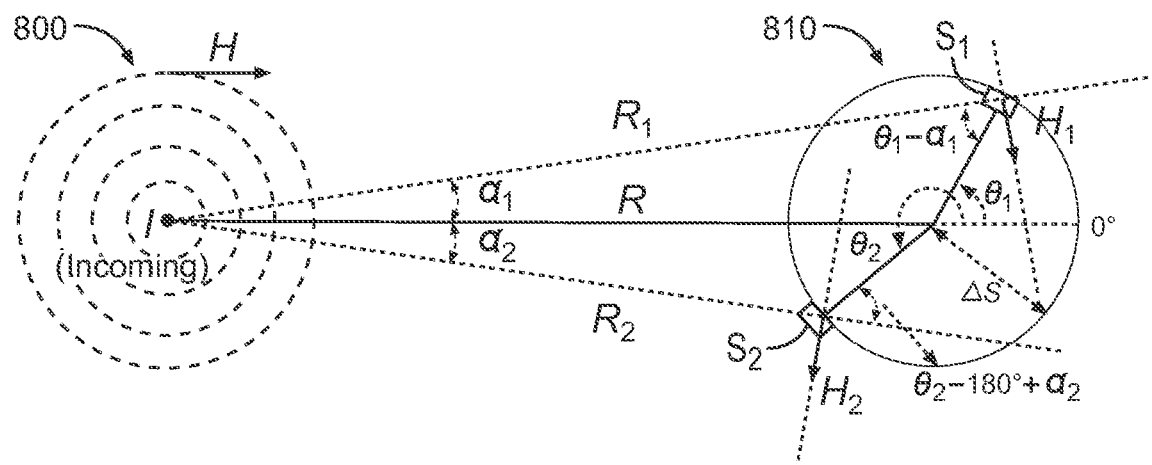

Instead of using two sensors oriented 180 degrees away from each other, the sensors can be oriented at any tool azimuth location, as long as the relative azimuth angle between them is known. As shown in FIG. 8, which presents an infinite line source 800 and a down hole tool housing 810, such as a logging tool, equipped with two sensors S1, S2 for gradient field determination. Sensor S1 is located at tool azimuth $\theta_1$ and sensor S2 is located at tool azimuth angle $\theta_2$. The azimuthal difference $\theta_2-\theta_1$ is known based on the physical sensor locations. This configuration can also utilize all of the methods described above to determine ranging distance and direction.

Figure 9:
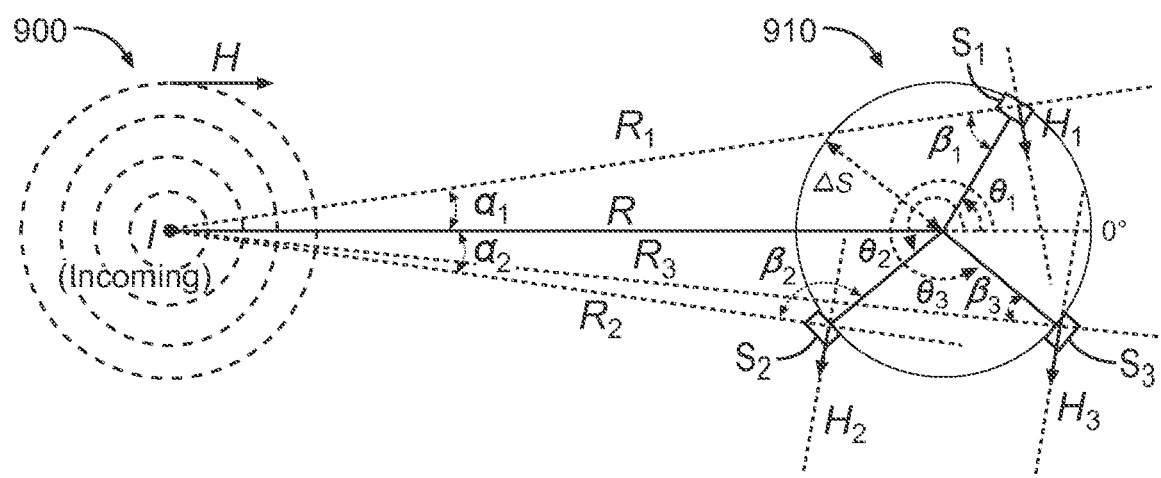

Another configuration, shown in FIG. 9, which presents an infinite line source 900 and a down hole tool housing 910, such as a logging tool, equipped with three sensors S1, S2, S3 to provide a variety of sets of gradient field measurements. Again, the azimuthal difference between each of the sensors is known (i.e., the difference between the angles $\theta_2-\theta_1$, $\theta_3-\theta_1$, and $\theta_3-\theta_2$ are known).

It is noted that a blind spot sometimes occurs when only two sensors are used in a logging tool. This is because at a certain azimuth angle between the sensors and the line source, the sensors will make nearly identical field measurements, causing gradient field calculations to fail. Therefore, a combination of three or more sensors making measurements at different tool azimuth angles provide gradient measurements that can be used more effectively to determine the ranging distance R—since there will not be any blind spots that appear during some portion of tool housing rotation.

All methods described herein are applicable to any number of sensors that is greater than two, as long as the relative azimuth difference between each sensor is known.

Another Processing Method for Calculating Distance Using Magnetic Fields

Another set of equations can be used to calculate the distance R to the target well. In this method, the magnetic field gradient shown in prior sections is not used directly. Even so, at least two sensors are used to measure the magnetic fields that are used to calculate the distance R.

Consider two sensors S1, S2 used to measure magnetic fields as shown in FIG. 3. Based on Equation (1), the distance between each sensor and the line source $R_1$ and $R_2$ is related to the magnetic field at the position of sensor and the current on source as:

$$|H_1| = \frac{I}{2\pi R_1}, \tag{31a}$$

and $$|H_2| = \frac{I}{2\pi R_2}. \tag{31b}$$

Using Equations (31a) and (31b), the ratio of the distance $R_1$ and $R_2$ is related to the magnitude of magnetic fields read by the two sensors S1, S2 as:

$$\frac{R_2}{R_1} = \frac{|H_1|}{|H_2|}. \tag{32}$$

By looking at the geometry of the structure shown in FIG. 3, the relationship between $R_i$, i=1, 2 and the angles can be written as:

$$R_2^2 = R_1^2 + (2\Delta S)^2 - 2R_1(2\Delta S)\cos(\theta-\alpha_1), \tag{33}$$

where $(\theta-\alpha_1)$ can be obtained using the tangential and normal components of the magnetic field measured by sensor S1:

$$(\theta-\alpha_1) = \tan^{-1}\frac{H_{1,tangential}}{H_{1,normal}}. \tag{34}$$

Combining Equations (32) and (33) provides Equation (35), where $R_1$ can be calculated by solving the second-degree equation:

$$R_1^2\left(1-\left(\frac{|H_1|}{|H_2|}\right)^2\right) - R_1(4\Delta S\cos(\theta-\alpha_1)) + (2\Delta S)^2 = 0. \tag{35}$$

Once $R_1$ is obtained, the distance R can be calculated using Equation (36):

$$R^2 = R_1^2 + \Delta S^2 - 2R_1\Delta S\cos(\theta-\alpha_1). \tag{36}$$

As discussed previously, to avoid blind spots that may arise during rotation, three sensors can be used to make measurements and computer the range R at all angles of rotation.

Thus, consider three sensors attached to a tool housing 910 as shown in FIG. 9. Here, the azimuthal difference between each of the sensors is known (i.e., angles $\theta_2-\theta_1$, $\theta_3-\theta_1$, and $\theta_3-\theta_2$ are known). Thus, the distance between each sensor and the source can be written as:

$$|H_1| = \frac{I}{2\pi R_1}, \tag{37a}$$

$$|H_2| = \frac{I}{2\pi R_2}, \tag{37b}$$

and $$|H_3| = \frac{I}{2\pi R_3}. \tag{37c}$$

By reviewing the geometry of the structure shown in FIG. 9, the relationship between $R_i$, i=1, 2, 3, the angles, and the ranging distance R can be calculated as:

$$R^2 = R_1^2 + \Delta S^2 - 2R_1\Delta S\cos\beta_1, \tag{38a}$$

$$R^2 = R_2^2 + \Delta S^2 - 2R_2\Delta S\cos\beta_2, \text{ and} \tag{38b}$$

$$R^2 = R_3^2 + \Delta S^2 - 2R_3\Delta S\cos\beta_3, \tag{38c}$$

where $\beta_i$ can be acquired using the tangential and normal components of the magnetic field measured by each sensor, as:

$$\beta_i = \tan^{-1} \frac{H_{i,tangential}}{H_{i,normal}}; i = 1, 2, 3. \tag{39}$$

Now, using substitution and equations (37), (38), and (39) together, the distance R can be calculated. This method can be applied to any combination or number of sensors.

Because the separation distance between sensors is usually small compared to the ranging distance R (e.g., the distance to target well), noise can be a significant source of error. When noise does introduce significant errors into the distance measurement, and there are more than two sensors installed on the tool, the magnitude of the field given by all of the sensors may be examined, and the two sensors providing the largest difference in their magnetic field measurements can be used to calculate the ranging distance R—to help reduce the effect of the noise.

These mechanisms permit using a variety of measurements, including the total field, tangential field, or normal field to achieve ranging determination, without knowing or calculating the ranging direction θ between sensors and the target well.

Additional Detailed Description and Some Representative Embodiments

Figure 10:
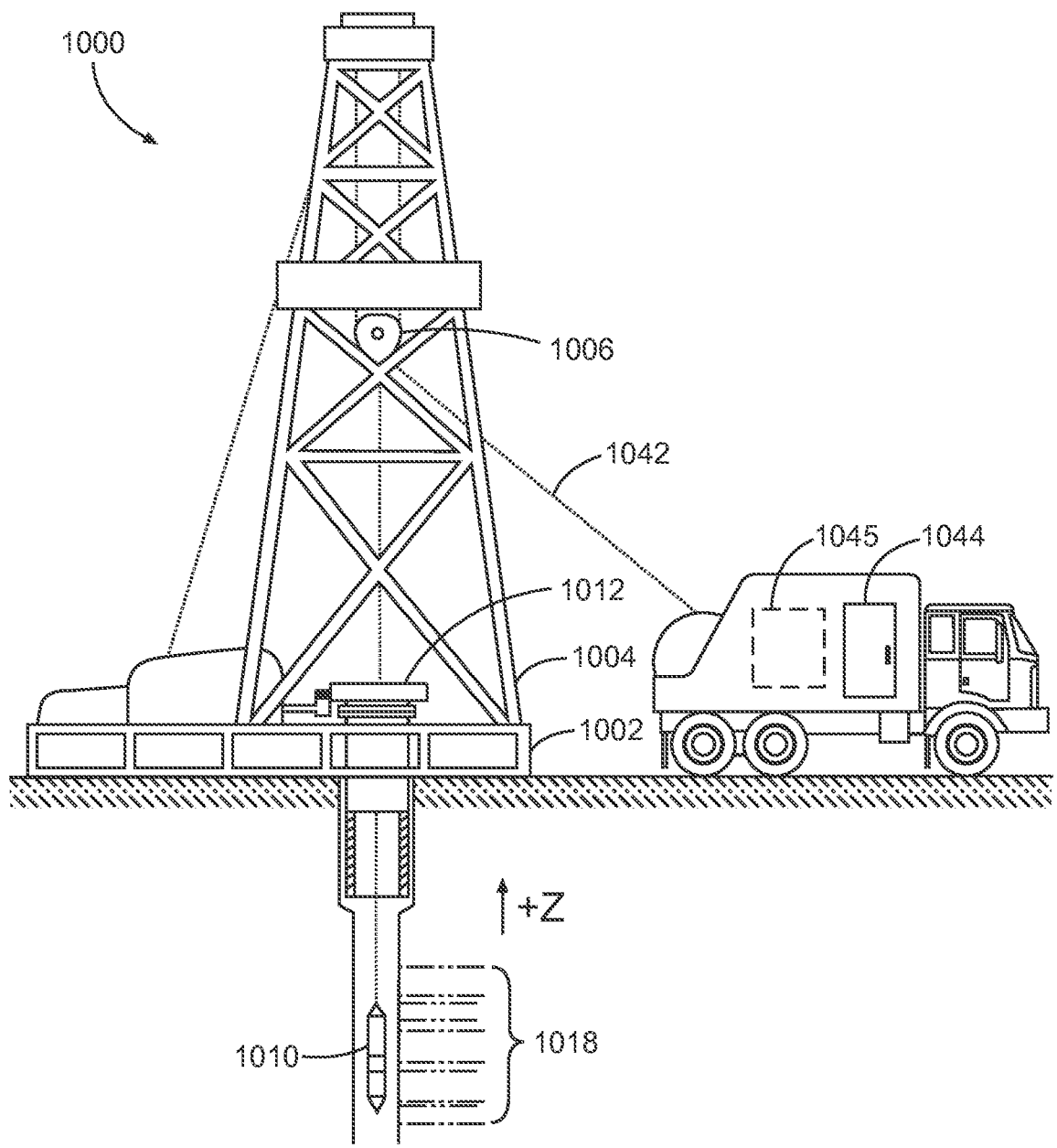
FIG. 10 is a block diagram of a wireline system implementation of various embodiments.

FIG. 10 is a block diagram of a wireline system 1000 implementation of various embodiments. The system 1000 of FIG. 10 may include any of the embodiments of receiver or sensor mounting discussed previously. In this case, a hoist 1006 may be included as a portion of a platform 1002, such as might be coupled to a derrick 1004, and used to raise or lower equipment such as a wireline sonde 1010 into or out of a borehole. The wireline sonde 1010 may include any one or more of the above-described embodiments, including sensors S1, S2, S3, S4 and a range determination module RD.

In this wireline example, a cable 1042 may provide a communicative coupling between a logging facility 1044 (e.g., including a processor circuit 1045 including memory or other storage or control circuitry) and the sonde 1010. In this manner, information about the formation 1018 may be obtained. The processor circuit 1045 can be configured to access and execute instructions stored in a memory to implement any of the methods described herein (e.g., by accessing a range determination module RD).

Figure 11:
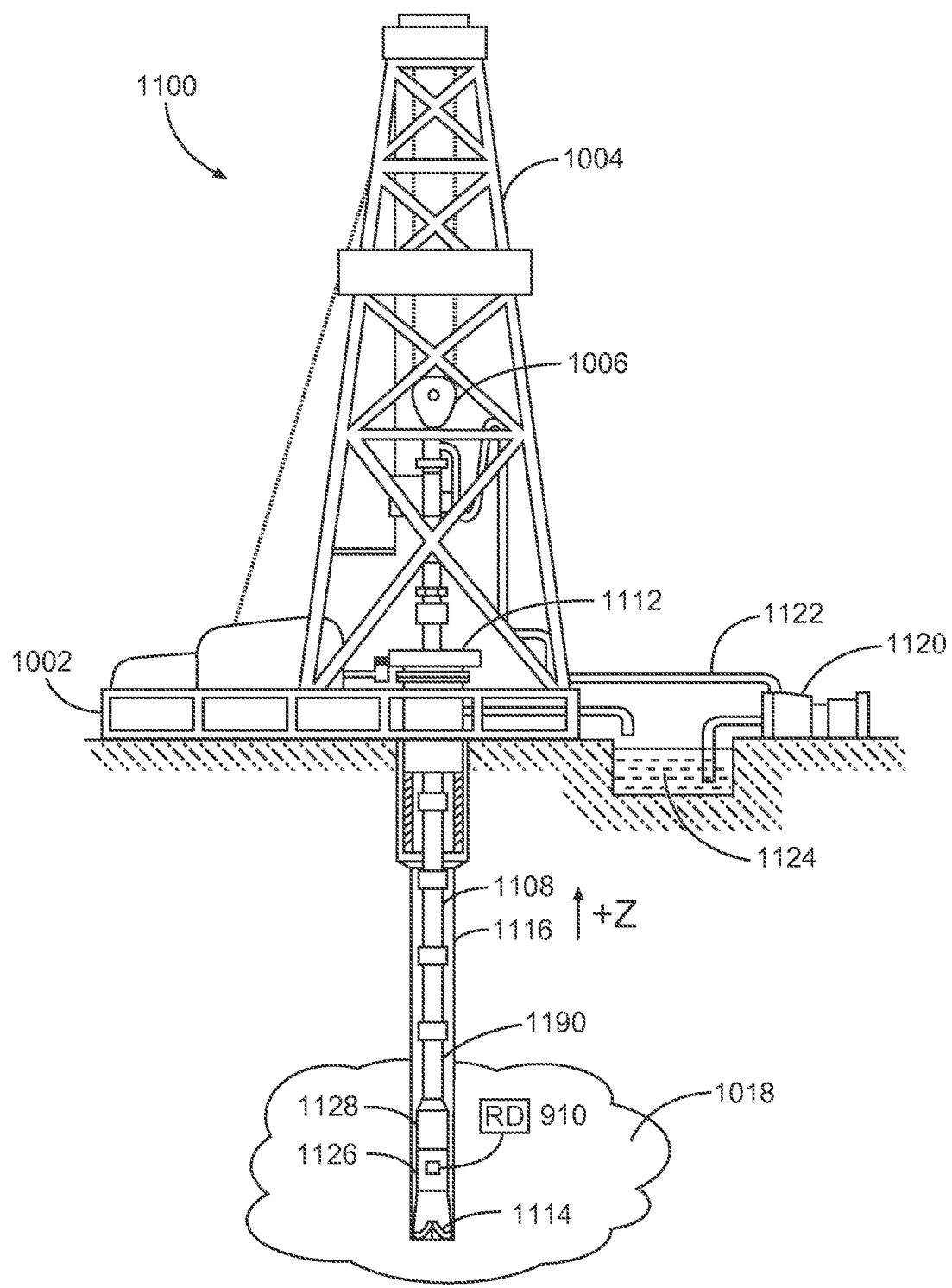
FIG. 11 is a block diagram of a drilling system implementation of various embodiments.

FIG. 11 is a block diagram of a drilling system 1100 implementation of various embodiments. This diagram shows a drilling rig system 1100 according to various embodiments that may include MWD or LWD capability. The drilling apparatus can use data from an insert in the drill string 1108, having attached to a number of receivers or sensors as discussed previously, and using acquired and calculated ranging information to steer the drill bit 1114.

A drilling rig or platform 1002 generally includes a derrick 1004 or other supporting structure, such as including or coupled to a hoist 1006. The hoist 1006 may be used for raising or lowering equipment or other apparatus such as drill string 1108. The drill string 1108 may access a borehole 1116, such as through a well head 1012. The lower end of the drill string 1108 may include various apparatus, such as a drill bit 1114, such as to provide the borehole 1116.

A drilling fluid or "mud" may be circulated in the annular region around the drill bit 1114 or elsewhere, such as provided to the borehole 1116 through a supply pipe 1122, circulated by a pump 1120, and returning to the surface to be captured in a retention pit 1124 or sump. Various subs or tool assemblies may be located along the drill string 1108, such as a bottom hole assembly (BHA) 1126 or a second sub 1128. The BHA 1126 and/or the sub 1128 may include one or more sensors S1, S2, S3, S4 or receivers, as described herein, along with a current source (e.g., power supply 148) to initiate a ranging signal, and a processor with access to a memory that contains a program to implement any of the methods described herein (e.g., a ranging determination module RD).

Thus, some of the embodiments described herein may be realized in part, as a set of instructions on a computer readable medium 142 comprising ROM, RAM, CD, DVD, hard drive, flash memory device, or any other computer readable medium, now known or unknown, that when executed causes a computing system, such as computer as illustrated in FIG. 1 or some other form of a data processing device 140, to implement portions of a method of the present disclosure, for example the processes and methods described herein (e.g., for computer-assisted well completion).

Though sometimes described serially herein, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system range and performance can be extended with the various embodiments described herein. Power can often be saved, and accuracy of ranging measurements improved. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

While the text of this document has been divided into sections, it should be understood that this has been done as a matter of convenience, and that the embodiments discussed in any one section may form a part of any or more embodiments described in another section, and vice-versa. Moreover, various embodiments described herein may be combined with each other, without limitation. Thus, many embodiments may be realized.

Similarly, while some of the above-described embodiments may show only one receiver, perhaps in the form of a magnetometer, coil, or telemetry receiver, one of ordinary skill in the art would realize that a drill string or downhole tool may include multiple receivers for making the various measurements described herein. Examples of various embodiments will now be listed in a non-limiting fashion.

In some embodiments, an apparatus comprises a down hole tool housing attached to two sensors rotatable by a selected number of degrees in an azimuthal plane, each of the sensors to measure an electromagnetic field strength component comprising at least a normal component, a tangential component, or a total field component. In some embodiments, the selected number of degrees of rotation are selected to provide a threshold gradient field magnitude. In some embodiments, the selected number of degrees of rotation are selected to provide a threshold gradient field magnitude above a determined noise level.

In some embodiments, the apparatus further comprises a range determination module to receive the normal component, the tangential component, or the total field component as a first set of field strength components from each of the two sensors provided by the two sensors when the two sensors are located at a first azimuthal location, and as a second set of field strength components from each of the two sensors provided by the two sensors when the two sensors are located at a second azimuthal location different from the first location. In some embodiments, the range determination module is to determine an approximate range from the two sensors disposed in a second well, to a first well, via direct transmission or backscatter transmission of an electromagnetic field from the first well, when a range direction associated with the housing upon which the two sensors are mounted is unknown.

In some embodiments of the apparatus, or a system, or a method, a vector sum of the normal component and the tangential component and/or the longitudinal component provides the total field component. In some embodiments, the range determination module is to determine the approximate range as a combination of the range direction and a range distance from the second well to the first well based on the normal component, the tangential component, or the total field component.

In some embodiments, an apparatus comprises a down hole tool housing attached to two sensors, each of the sensors to measure a set of electromagnetic field strength components comprising a normal component, a tangential component, and a longitudinal component. In some embodiments, the apparatus comprises a range determination module to receive the set of electromagnetic field strength components from each of the two sensors, and to determine an approximate range from the two sensors disposed in a second well, to a first well, via direct transmission or backscatter transmission of an electromagnetic field from the first well, when a range direction associated with the housing upon which the two sensors are mounted is unknown.

In some embodiments, the set of electromagnetic field strength components comprises a first group of measurements made at a first elevation in the second well, and the set of electromagnetic field strength components comprises a second group of measurements made at a second elevation in the second well.

In some embodiments, the set of electromagnetic field strength components comprises a first group of measurements made at a first azimuthal location in the second well, and the set of electromagnetic field strength components comprises a second group of measurements made at a second azimuthal location in the second well.

In some embodiments, a system comprises a current source (e.g., a power supply) to couple current to one of a target well or a drilling well. In some embodiments, the system may comprise an apparatus that includes a range determination module to receive a normal component, a tangential component, or a total field component of an electromagnetic field strength measurement of a magnetic field created by flow of the current in the target well or the drilling well, as a first set of field strength components from each of at least two sensors provided by the sensors when the sensors are located at a first azimuthal location within the drilling well, and as a second set of field strength components from each of the sensors provided by the sensors when the sensors are located at a second azimuthal location within the drilling well. In some embodiments, the range determination module is to determine an approximate range from the sensors disposed in the drilling well to the target well, via direct transmission from the target well, or via backscatter transmission from the target well, when a range direction associated with a housing upon which the sensors are mounted is unknown.

In some embodiments, the first and the second sets comprise the normal components or total field components, and the range determination module is to determine a range distance R from the equation $$\sqrt{\frac{1}{\left(\frac{\Delta H}{2\Delta S}\right)^2_{First\ Set} + \left(\frac{\Delta H}{2\Delta S}\right)^2_{Second\ Set}}},$$

wherein $\Delta H$ is a field difference between field strength components of the first or the second sets, H is a field sum between field strength components of the first or the second sets, and wherein $2\Delta S$ is separation distance between the at least two sensors. This equation is applicable for both normal component calculation or total field component calculation. The only difference is the corresponding relationship of the equation to the ranging distance and the ranging direction, as indicated in the following paragraphs.

In some embodiments, the first and the second sets comprise the normal component, and the range determination module is to calculate a portion of a first equation based on the first set of field strength components as $$\frac{H}{\frac{\Delta H}{2\Delta S_{First\ Set}}} = -\frac{R}{2\cos\theta}\left(1 + \left(\frac{\Delta S}{R}\right)^2\right),$$

wherein the approximate range comprises R as a range distance and $\Theta$ as a range direction, and wherein $2\Delta S$ is separation distance between the at least two sensors; and wherein the range determination module is to calculate a portion of a second equation based on the second set of field strength components as $$\frac{H}{\frac{\Delta H}{2\Delta S_{Second\ Set}}} = \frac{R}{2\sin\theta}\left(1 + \left(\frac{\Delta S}{R}\right)^2\right),$$

such that a ratio of the first equation and the second equation provides the range direction. In some embodiments, the range distance is determined by either the first or the second equation without knowing the range direction Θ.

In some embodiments, the first and the second sets comprise the tangential component, and the range determination module is to calculate a portion of a first equation based on the first set of field strength components as $$\frac{H}{\frac{\Delta H}{2\Delta S}_{First\ Set}} = -\frac{R\cos\theta(R^2 - \Delta S^2)}{(R^2\cos 2\theta - \Delta S^2)}$$

wherein the approximate range comprises R as a range distance and Θ as a range direction, and wherein 2ΔS is separation distance between the at least two sensors; and wherein the range determination module is to calculate a portion of a second equation based on the second set of field strength components as $$\frac{H}{\frac{\Delta H}{2\Delta S}_{Second\ Set}} = -\frac{R\sin\theta(R^2 - \Delta S^2)}{(-R^2\cos 2\theta - \Delta S^2)},$$

to provide both the range distance and the range direction.

In some embodiments, the first and the second sets comprise the total field component, and the range determination module is to calculate a portion of a first equation based on the first set of field strength components as $$\frac{H}{\frac{\Delta H}{2\Delta S}_{First\ Set}} \approx -\frac{R}{\cos\theta}$$

wherein the approximate range comprises R as a range distance and Θ as a range direction, and wherein 2ΔS is separation distance between the at least two sensors; and wherein the range determination module is to calculate a portion of a second equation based on the second set of field strength components as $$\frac{H}{\frac{\Delta H}{2\Delta S}_{Second\ Set}} \approx \frac{R}{\sin\theta},$$

such that a ratio of the first equation and the second equation provides the range direction. In some embodiments, the range distance can be determined by either the first or the second equation without knowing the range direction Θ.

In some embodiments, a system comprises a current source (e.g., a power supply) to couple current to one of a target well or a drilling well. In some embodiments, the system comprises an apparatus that includes a down hole tool housing attached to two sensors, each of the two sensors to measure a set of electromagnetic field strength components comprising a normal component, a tangential component, or a longitudinal component. In some embodiments, the system further comprises a range determination module to receive the set of electromagnetic field strength components from each of the two sensors, values of the set determined by a field strength due to flow of the current in the target well or the drilling well. In some embodiments, the range determination module is to determine an approximate range from the two sensors disposed in the drilling well, to the target well, via direct transmission or backscatter transmission of an electromagnetic field characterized by the field strength, when a range direction associated with the housing upon which the two sensors are mounted is unknown.

In some embodiments, the range determination module is to use a combination of ratios of the electromagnetic field strength components and a separation distance between the two sensors to determine the approximate range as a combination of a range distance and a range direction.

In some embodiments, the down hole tool housing is attached to a third sensor, and the range determination module is to use a subset of the electromagnetic field strength components that have a greatest difference in measured component values to determine the approximate range.

In some embodiments, a method comprises receiving normal, tangential, and longitudinal components of electromagnetic field strength measurements within a first well as a set of field strength components from at least one sensor, wherein the at least one sensor is used to take multiple azimuthal field strength measurements at a single depth. In some embodiments, the method further comprises determining an approximate range from the at least one sensor to a second well that serves as a source of an electromagnetic field, via direct transmission or backscatter transmission, when a range direction associated with a housing upon which the at least one sensor is mounted is unknown.

In some embodiments, the method comprises receiving the normal, tangential, or total field components as a first set of field strength components from each of two sensors when the two sensors are located at a first azimuthal location within the first well; receiving the normal, tangential, or total field components as a second set of field strength components from each of the two sensors when the two sensors are located at a second azimuthal location within the first well different from the first location; and determining the approximate range from the two sensors disposed within the first well, to the second well, using only one of the normal, the tangential or the total field components, respectively.

In some embodiments, the method comprises comparing signal magnitudes in the electromagnetic field strength measurements; determining a subset of the electromagnetic strength field strength measurements that have a greatest difference in measured component values; and selecting the subset to determine the approximate range.

In some embodiments, a method comprises receiving normal, tangential, or total field components of electromagnetic field strength measurements within a first well as a set of field strength components from each of at least three sensors located at three different azimuthal locations while the sensors remain relatively stationary within the first well. In some embodiments, the method comprises determining an approximate range from the sensors to a second well that serves as a source of an electromagnetic field, via direct transmission or backscatter transmission, when a range direction associated with a housing upon which the sensors are mounted is unknown.

In some embodiments, an apparatus comprises a down hole tool housing (e.g., ranging tool 124) attached to a set of sensors, the down hole tool housing comprising one or more of a wireline sonde, a bottom hole assembly, a drill collar, a drill string pipe, or a sub. Some embodiments of this apparatus further comprise a processor (e.g., computer 140) communicatively coupled to the set of sensors to receive electromagnetic signal strength signals from the sensors, and to a memory (e.g., medium 142), the memory having a set of instructions which, when executed by the processor, cause the processor to implement any of the methods described herein.

In some embodiments, a system comprises a source of current or voltage (e.g., power supply 148) to electrically couple to a well casing of a first well or to attach to a first down hole tool housing. Some embodiments of this system further comprise a drill string to be disposed in a second well and mechanically coupled to a second down hole tool housing, the second down hole tool housing attached to a set of sensors. Some embodiments of this system further comprise a processor (e.g., computer 140) communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory (e.g., medium 142) having a set of instructions which, when executed by the processor, cause the processor to implement any of the methods described herein.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 10). It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An apparatus, comprising:
    a down hole tool housing attached to at least two sensors rotatable by a selected number of degrees in an azimuthal plane, each of the sensors to measure an electromagnetic field strength component comprising at least a normal component, a tangential component, or a total field component; and
    a range determination module to receive the normal component, the tangential component, or the total field component as a first set of field strength components from each of the sensors provided by the sensors when the sensors are located at a first azimuthal location, and as a second set of field strength components from each of the sensors provided by the sensors when the sensors are located at a second azimuthal location different from the first location, and to determine an approximate range from the sensors disposed in a second well, to a first well based on a gradient field in the azimuthal plane determined from one or more of the field strength components, the approximate range being determined via direct transmission or backscatter transmission of an electromagnetic field from the first well, when a range direction associated with the housing upon which the sensors are mounted is unknown.

2. The apparatus of claim 1, wherein a vector sum of the normal component and the tangential component and/or the longitudinal component provides the total field component.

3. The apparatus of claim 1, wherein the selected number of degrees of rotation are selected to provide a threshold gradient field magnitude.

4. The apparatus of claim 3, wherein the selected number of degrees of rotation are selected to provide a threshold gradient field magnitude above a determined noise level.

5. The apparatus of claim 1, wherein the range determination module is to determine the approximate range as a combination of the range direction and a range distance from the second well to the first well based on the normal component, the tangential component, or the total field component.

6. An apparatus, comprising:
    a down hole tool housing attached to at least two sensors located in an azimuthal plane, each of the sensors to measure a set of electromagnetic field strength components at different azimuthal locations in the azimuthal plane, the set of electromagnetic field strength components comprising a normal component, a tangential component, and a longitudinal component; and
    a range determination module to receive the set of electromagnetic field strength components from each of the sensors, and to determine an approximate range from the sensors disposed in a second well, to a first well based on a gradient field in the azimuthal plane determined from one or more of the field strength components, the approximate range being determined, via direct transmission or backscatter transmission of an electromagnetic field from the first well, when a range direction associated with the housing upon which the sensors are mounted is unknown.

7. The apparatus of claim 6, wherein the set of electromagnetic field strength components comprises a first group of measurements made at a first elevation in the second well, and wherein the set of electromagnetic field strength components comprises a second group of measurements made at a second elevation in the second well.

8. The apparatus of claim 6, wherein the set of electromagnetic field strength components comprises a first group of measurements made at a first azimuthal location in the second well, and wherein the set of electromagnetic field strength components comprises a second group of measurements made at a second azimuthal location in the second well.

9. A system, comprising:
    a current source to couple current to one of a target well or a drilling well; and an apparatus comprising a range determination module to receive a normal component, a tangential component, or a total field component of an electromagnetic field strength measurement of a magnetic field created by flow of the current in the target well or the drilling well, as a first set of field strength components from each of at least two sensors provided by the sensors when the sensors are located at a first azimuthal location of an azimuthal plane within the drilling well, and as a second set of field strength components from each of the sensors provided by the sensors when the sensors are located at a second azimuthal location of the azimuthal plane within the drilling well, and to determine an approximate range from the sensors disposed in the drilling well to the target well based on a gradient field in the azimuthal plane determined from one or more of the field strength components, the approximate range being determined via direct transmission from the target well, or via backscatter transmission from the target well, when a range direction associated with a housing upon which the sensors are mounted is unknown.

10. The system of claim 9, wherein the first and the second sets comprise the normal components or the total field components, and the range determination module is to determine a range distance R from the equation $$\sqrt{\frac{1}{\left(\frac{\Delta H}{2\Delta S}\right)^2_{First\ Set} + \left(\frac{\Delta H}{2\Delta S}\right)^2_{Second\ Set}}},$$

wherein $\Delta H$ is a field difference between field strength components of the first or the second sets, H is a field sum between field strength components of the first or the second sets, and wherein $2\Delta S$ is separation distance between the at least two sensors.

11. The system of claim 9, wherein the first and the second sets comprise the normal component, and the range determination module is to calculate a portion of a first equation based on the first set of field strength components as $$\frac{H}{\frac{\Delta H}{2\Delta S_{First\ Set}}} = -\frac{R}{2\ \cos\theta}\left(1 + \left(\frac{\Delta S}{R}\right)^2\right),$$

wherein the approximate range comprises R as a range distance and $\Theta$ as a range direction, and wherein $2\Delta S$ is separation distance between the at least two sensors; and wherein the range determination module is to calculate a portion of a second equation based on the second set of field strength components as $$\frac{H}{\frac{\Delta H}{2\Delta S_{Second\ Set}}} = \frac{R}{2\ \sin\theta}\left(1 + \left(\frac{\Delta S}{R}\right)^2\right),$$

such that a ratio of the first equation and the second equation provides the range direction.

12. The system of claim 9, wherein the first and the second sets comprise the tangential component, and the range determination module is to calculate a portion of a first equation based on the first set of field strength components as $$\frac{H}{\frac{\Delta H}{2\Delta S_{First\ Set}}} = -\frac{R\ \cos\theta(R^2 - \Delta S^2)}{(R^2\ \cos 2\theta - \Delta S^2)},$$

wherein the approximate range comprises R as a range distance and $\Theta$ as a range direction, and wherein $2\Delta S$ is separation distance between the at least two sensors; and wherein the range determination module is to calculate a portion of a second equation based on the second set of field strength components as $$\frac{H}{\frac{\Delta H}{2\Delta S_{Second\ Set}}} = \frac{R\ \sin\theta(R^2 - \Delta S^2)}{(-R^2\ \cos 2\theta - \Delta S^2)},$$

to provide both the range distance and the range direction.

13. The system of claim 9, wherein the first and the second sets comprise the total field component, and the range determination module is to calculate a portion of a first equation based on the first set of field strength components as $$\frac{H}{\frac{\Delta H}{2\Delta S_{First\ Set}}} \approx -\frac{R}{\cos\theta},$$

wherein the approximate range comprises R as a range distance and $\Theta$ as a range direction, and wherein $2\Delta S$ is separation distance between the at least two sensors; and wherein the range determination module is to calculate a portion of a second equation based on the second set of field strength components as $$\frac{H}{\frac{\Delta H}{2\Delta S_{Second\ Set}}} \approx \frac{R}{\sin\theta},$$

such that a ratio of the first equation and the second equation provides the range direction.

14. A system, comprising:
a current source to couple current to one of a target well or a drilling well; and
an apparatus comprising a down hole tool housing attached to at least two sensors located in an azimuthal plane, each of the sensors to measure a set of electromagnetic field strength components at different azimuthal locations in the azimuthal plane, the set of electromagnetic field strength components comprising a normal component, a tangential component, or a longitudinal component, and a range determination module to receive the set of electromagnetic field strength components from each of the sensors, values of the set determined by a field strength due to flow of the current in the target well or the drilling well, and to determine an approximate range from the sensors disposed in the drilling well, to the target well, based on a gradient field in the azimuthal plane determined from one or more of the field strength components, the approximate range being determined via direct transmission or backscatter transmission of an electromagnetic field characterized by the field strength, when a range direction associated with the housing upon which the sensors are mounted is unknown.

15. The system of claim 14, wherein the range determination module is to use a combination of ratios of the electromagnetic field strength components and a separation distance between two sensors to determine the approximate range as a combination of a range distance and a range direction.

16. The system of claim 14, wherein the down hole tool housing is attached to a third sensor, and wherein the range determination module is to use a subset of the electromagnetic field strength components that have a greatest difference in measured component values to determine the approximate range.

17. A method, comprising:
receiving normal, tangential, and longitudinal components of electromagnetic field strength measurements within a first well as a set of field strength components from at least one sensor rotatable by a selected number of degrees in an azimuthal plane, wherein the at least one sensor is used to take multiple azimuthal field strength measurements at a single depth; and
determining an approximate range from the at least one sensor to a second well that serves as a source of an electromagnetic field based on a gradient field in the azimuthal plane determined from the field strength components, the approximate range being determined via direct transmission or backscatter transmission, when a range direction associated with a housing upon which the at least one sensor is mounted is unknown.

18. The method of claim 17, further comprising:
receiving the normal, tangential, or total field components as a first set of field strength components from each of two sensors when the two sensors are located at a first azimuthal location within the first well;
receiving the normal, tangential, or total field components as a second set of field strength components from each of the two sensors when the two sensors are located at a second azimuthal location within the first well different from the first location; and
determining the approximate range from the two sensors disposed within the first well, to the second well, using only one of the normal, the tangential or the total field components, respectively.

19. The method of claim 18, further comprising:
comparing signal magnitudes in the electromagnetic field strength measurements;
determining a subset of the electromagnetic strength field strength measurements that have a greatest difference in measured component values; and
selecting the subset to determine the approximate range.

20. A method, comprising:
receiving normal, tangential, or total field components of electromagnetic field strength measurements within a first well as a set of field strength components from each of at least three sensors located at three different azimuthal locations in an azimuthal plane while the sensors remain relatively stationary within the first well; and
determining an approximate range from the sensors to a second well that serves as a source of an electromagnetic field based on a gradient field in the azimuthal plane determined from one or more of the field strength components, the approximate range being determined via direct transmission or backscatter transmission, when a range direction associated with a housing upon which the sensors are mounted is unknown.

* * * * *